United States Patent
Gester (10) Patent No.: US 7,034,522 B2
(45) Date of Patent: Apr. 25, 2006

(54) METHOD AND APPARATUS FOR MEASURING MOVEMENT, DISPLACEMENT AND/OR DEFORMATION

(75) Inventor: Matthias Gester, Hants (GB)

(73) Assignee: Weston Aerospace Limited, London (GB)

( * ) Notice: Subject to any disclaimer, the term of this patent is extended or adjusted under 35 U.S.C. 154(b) by 139 days.

(21) Appl. No.: 10/321,843

(22) Filed: Dec. 18, 2002

(65) Prior Publication Data

US 2004/0027116 A1    Feb. 12, 2004

(30) Foreign Application Priority Data

Dec. 20, 2001    (GB)    ................................ 0130544

(51) Int. Cl.
  *G01B 7/30*    (2006.01)
  *G01P 3/48*    (2006.01)
  *G01L 3/10*    (2006.01)

(52) U.S. Cl. ............. 324/207.16; 324/166; 324/173; 324/207.25; 324/207.17; 324/209; 73/779; 73/862.331

(58) Field of Classification Search ............. 324/166, 324/173, 174, 207.15, 207.16, 207.17, 207.25, 324/209; 73/862.331, 779
See application file for complete search history.

(56) References Cited

U.S. PATENT DOCUMENTS

| | | | |
|---|---|---|---|
| 3,940,979 A | 3/1976 | Ward et al. | |
| 3,980,913 A | 9/1976 | Peterson | |
| 4,100,794 A * | 7/1978 | Meixner | .................. 73/862.28 |
| 4,414,856 A | 11/1983 | Winterhoff | |
| 4,481,471 A | 11/1984 | Miller et al. | |
| 4,602,515 A | 7/1986 | Eichenlaub | |
| 4,639,595 A | 1/1987 | Okita et al. | |
| 4,691,192 A | 9/1987 | Baker | |
| 4,939,937 A | 7/1990 | Klauber et al. | |
| 5,111,138 A * | 5/1992 | Kramer | ...................... 324/174 |
| 5,606,137 A | 2/1997 | Penketh | |
| 5,675,094 A | 10/1997 | Klauber et al. | |
| 5,754,042 A | 5/1998 | Schroeder et al. | |
| 6,084,368 A | 7/2000 | Doemens et al. | |

FOREIGN PATENT DOCUMENTS

DE    4 313 556    9/1994

(Continued)

OTHER PUBLICATIONS

K. Miyashita et al, "Non-Contact Magnetic Torque Sensor" *IEEE Transactions on Magnetics*, vol. 26, No. 5, 1990, pp. 1560-1562.

W. Krimmel, "Induktive Aufnehmer Mit Zukunft" *Messen Prufen Automatisieren*, Nov. 1985, pp. 614-618.

(Continued)

Primary Examiner—Jay Patidar
(74) Attorney, Agent, or Firm—Nixon & Vanderhye P.C.

(57) ABSTRACT

A non-contact rotation speed and torque sensing device which uses the natural inhomogeneities in the magnetic properties of a rotating element (4) to measure movement, displacement and deformation of the rotating element. An alternating magnetic field is applied in the region of a rotating element (4) and a signal representing the change in magnetic flux caused by the inhomogeneities of the magnetic structure of the object is received at a sensor (1). By processing the sensed signal using the auto-correlation function, the speed of rotation of the element (4) may be determined through inspection of the periodicity of the signal.

34 Claims, 5 Drawing Sheets

FOREIGN PATENT DOCUMENTS

| | | |
|---|---|---|
| DE | 4 331 024 | 3/1995 |
| EP | 0 046 517 | 3/1982 |
| EP | 0 103 354 | 3/1984 |
| EP | 0 167 656 | 1/1986 |
| EP | 0 168 692 | 1/1986 |
| EP | 0 261 980 | 3/1988 |
| EP | 0 464 964 | 1/1992 |
| GB | 2 008 765 | 6/1979 |
| GB | 1 586 080 | 3/1981 |

OTHER PUBLICATIONS

R. Wolffenbuttel et al, "Noncontact Capacitive Torque Sensor For Use on a Rotating Axle" *IEEE Transactions on Instrumentation and Measurement*, vol. 39, No. 6, Dec. 1990, pp. 1008-1013.

F.E. Scoppe, "Magnetostrictive Torque Transducer" *Instrumentation Technology*, vol. 16, Oct. 1969, pp. 95-99.

* cited by examiner

METHOD AND APPARATUS FOR MEASURING MOVEMENT, DISPLACEMENT AND/OR DEFORMATION

BACKGROUND OF THE INVENTION

1. Field of the Invention

The present invention is concerned with method and apparatus for measuring movement, displacement and/or deformation of the surface of a rotating and/or torque transmitting element. More particularly the invention is concerned with non-contacting measurement of the speed and/or torque of a rotating element.

2. Discussion of Prior Art

Engineers and scientists have long wished to produce simple, reliable and accurate means for measuring the torque in and/or speed of elements such as rotating shafts. Measurements of torque and/or speed are necessary for diagnosis, prognosis and load level monitoring of rotary drive systems such as plane, car and ship engines, motors and generators, rotating machine tools etc.

The measurement of the mechanical power produced by an engine requires one to know both the torque and rotational speed of a shaft. The accurate on-line measurement of speed and torque is therefore critical for the determination of on-line power and efficiency of rotary drive devices.

Speed Measurement

Rotation speed is measured by detecting a periodic signal induced in a sensor by one or more markers or elements on the surface of the rotating element. The sensor or sensors are typically located near the surface of the rotary element (e.g. drum, disc, shaft or similar) and a signal is generated when a pre-determined and/or marked portion or portions of the element pass near the sensor. The rotation speed can be determined by measuring the time between the successive passages of the pre-determined marked portion or portions of the rotary device past the sensor or sensors.

There are a number of methods of creating and then noting the passage of surface markings or discontinuities required by the known speed measurement methods. These include:

a) Method of Variable Magnetic Reluctance

This involves the use of a coil and a permanent magnet located near a gear wheel which detects the disturbance of the magnetic flux produced by the permanent magnet as the teeth of the gear wheel pass through the magnetic field generated by the coil. An example of such a system is described in U.S. Pat. No. 3,980,913.

b) Magnetoresistive

Alternatively, magnetic markers are attached to the rotating element and the resulting periodic variation of magnetic flux can be detected using magnetoresistance sensors as shown in U.S. Pat. No. 5,754,042, or in K Miyashita et al. "Non-contact Magnetic torque sensor", IEEE Trans. Mgn., Vol. 26 No. 5, p. 1560 (1990).

c) Optical Methods

Rotation speed can also be detected optically by monitoring the reflection of light off the surface of a rotating element which contains marked regions of different optical reflectivity as shown in U.S. Pat. No. 4,639,595.

All of the known methods described above require some modification of the surface of the rotary element whose speed is being measured. A discontinuity or marker must be placed on the rotary element before its speed can be measured. These known systems are therefore relatively expensive and difficult to fit, particularly to fit to existing machinery or engines.

Other non-contact methods for measuring torque, which do not require modification of the rotating element, include those described in GB 2008765, GB 1586080, EP 0168692, EP 0167656, EP 0103354 and EP 0046517.

All these systems require that the rotating elements are made from a magnetic material and exploit the principle of magnetostriction. Magnetostriction refers to an interaction between magnetic and elastic properties of a material.

Application of a torque to a rotating element will result in the creation of a stress field in the element and a corresponding change in bulk magnetic permeability. An alternating magnetic field is applied to the element, so that it penetrates the element, and changes in the field caused by changes in bulk magnetic permeability are measured by a detector. It therefore can be determined with knowledge of the physical properties of the element, what torque is being applied to the rotating element.

These systems ignore the naturally occurring variations of magnetic properties in the material of a rotating object, treating it as noise, whilst measuring the changes in magnetic properties of the object with the applied stress. Embodiments of the present invention, however, make use of the naturally occurring variations and uses the cyclical repetition of a pattern past a sensor as the means for measuring rotation speed and torque.

Torque Measurement

Measurement of the torque transmitted by rotating elements is usually based on either the angular deflection or twist of a dedicated section of the torque transmitting element or from the strain at the surface of the torque transmitting element.

In one known method, twist of a rotating shaft or torque transmitting element is measured by generating a periodic signal from the monitoring of the movement or displacement of markings placed around the circumference of the shaft. Two sets of markings are used with one set at either end of a dedicated section whose twist is to be measured. The relative movement of the two separated sets of markings is a function of the twist of the section between the markings. U.S. Pat. No. 4,602,515 shows such a system in which torque is determined from the phase shift between the two periodic signals generated magnetically.

In another method, twist is measured by fixing a tubular structure surrounding the torque transmitting element at one end of the dedicated section whose twist is to be measured and keeping the tubular structure loose at the other end. Torque can then be determined from the relative concentrical displacement between the torque transmitting element and the tubular structure at the loose end using optical means as shown in U.S. Pat. No. 5,606,137, inductive means as shown in Krimmell W., "Induktiver Aufnehmer mit Zukunft", Messen, Prüfen, Automatisieren, p. 614 (1985) or capacitive means as shown in Wolffenbüttel, Non-contact capacitive torque sensor for use on a rotating code IEEE Trans. Instrum. Measure, vol. 39 no 6 p. 1008(1990).

For a circular shaft of length L, relative twist θ between its ends, shear modulus G and moment of inertia J, $$T = \frac{GJ\theta}{L}$$

Consequently for a shaft of constant G, J and L, torque is directly proportional to twist and easily determined therefrom provided G, J and L are known.

As with the methods of speed measurement previously described, the known methods of torque measurement require the surface of a rotating torque transmitting element such as a disc, drum or shaft to be modified to have the necessary markings and/or discontinuities.

SUMMARY OF THE INVENTION

Preferred embodiments of the present invention allow one to measure speed and/or torque without having to modify the surface of an existing shaft. Embodiments of the invention can therefore be fitted relatively easily and inexpensively to existing elements including rotating or rotatable elements.

The inventor of the present application is the first to realise that local variations in electrical conductivity and/or magnetic permeability of a rotating element can be used for rotation speed and/or torque measurement. The position, location, or distribution of variations in electrical conductivity or permeability depend on variations in the microstructure of the rotating element. The distribution of such variations is sufficiently fixed when compared to the rotation period of, say, a rotating shaft that signals derived from such variations can be used to pick up repetitive periodic signal characteristics as the, say, shaft rotates. The periodic signals so derived can then be used to determine rotation speed and/or torque.

The repetition of a particular microstructure variation (and its resulting effect on the output signal) or distribution of variations mark a revolution of the rotating element (which may be a disc, drum, shaft or some other element). Noting the periodicity of the output as a function of time can then give rotation speed.

The existence of local variations or inhomogeneities in the electrical and magnetic properties of a rotating metal or other electrically conductive element has previously been recognised. However, these local variations have always been considered a source of error and known torque sensors (e.g. U.S. Pat. No. 4,939,937 and EP 261,980) have sought to compensate for them or eliminate their effect.

The inventor of the subject application has appreciated that what was previously always considered a source of error to be eliminated and/or compensated for can actually itself be used to measure rotation speed and/or torque. He has also appreciated that even if the distribution of microstructure variations changes over time as discussed in U.S. Pat. No. 4,939,937 such changes are over a period significantly greater than the rotation period and can therefore be ignored for the purposes of measuring speed and/or torque.

Embodiments of the present invention solve the problem of providing a sensor for sensing the rotation speed and/or torque of a rotary element which does not require a specially modified rotating element. The solution lies in the counterintuitive realisation that what has previously been considered a source of error is in fact itself capable of providing an accurate measurement of rotation speed and/or torque.

In particular embodiments of the invention, speed and/or torque is sensed using either a coil placed near the surface of the rotating element and through which an AC current passes, or a magnetic core placed near the surface of the rotating element and having a drive coil through which AC current passes and a sensing coil magnetically supplied thereto.

Electrically conductive materials exhibit local variations of electrical conductivity and magnetic materials exhibit local variations of magnetic permeability. When an AC current is applied to a coil (preferably with a soft magnetic core), an alternating magnetic flux is generated, which induces eddy currents in the surface of an electrically conducting material placed near the coil. In the case of a magnetic material, the amount of magnetic flux guided through the surface of the rotating element depends on the relative magnetic permeability. Both effects strongly affect the inductance of the coil. Furthermore, when the material is moved relatively to the coil, local variations of the electrical conductivity and/or magnetic permeability will lead to a variation of the coil's inductance as described below and in U.S. Pat. No. 3,980,913.

Placing a sensor consisting of a coil driven by an AC current near the surface of a rotating element having an electrically conductive and/or magnetic surface will result in a periodically varying output signal reflecting variations in the element's microstructure. This periodicity can be used to identify particular portions of the element and hence act as a marker to indicate completed revolutions. Signal processing of the output signal using auto-correlation will produce a signal indicating the periodicity which can provide a measure of the rotation speed.

In other embodiments of the invention, the twist of an element is measured using two speed sensors placed a pre-determined distance apart.

Placing two sensors near the surface of the rotating element and separated from each other by a defined distance, and signal processing of the two periodic signals based on cross-correlation provides a measure of the shaft twist and hence the torque transmitted by the rotating element.

An important advantage of preferred embodiments of the proposed invention over all the known methods lies in the fact that no measurement specific modification to the rotating device or element is required. Apparatus according to the invention consists only of a small and simple sensing device which can be fitted at a relatively low cost if the entire rotating element or at least its surface is made from a material which is either electrically conductive or magnetically permeable or both. Furthermore, the proposed method requires no contact between the sensing device and the rotating element.

DETAILED DISCUSSION OF EMBODIMENTS

Preferred embodiments of the invention will now be described with reference to the attached figures, in which:

FIG. 5 shows a) a random periodic signal and b) the auto-correlation function of the signal in a);

FIG. 8 shows a) two different random periodic signals and b) the cross-correlation function of the signals as shown in a) and with a phase shift between the two signals shown in a).

BRIEF DESCRIPTION OF THE FIGURES

Metallic materials exhibit natural fluctuations in their microstructure. All or some of the structural features of the material such as grain shape, grain size, grain orientation and grain boundaries as well as crystal structure and surface roughness may vary. Such features can affect electrical conductivity and/or magnetic permeability. These structural fluctuations can therefore result in local variations of the electrical conductivity and in the case of magnetic materials, in local variations of the magnetic permeability.

In a first embodiment of the invention (see FIG. 1), either electrical conductivity or magnetic permeability variations or both can be detected using a sensor 1 comprising a single AC current or voltage driven coil 2 on a soft magnetic core 3.

When this coil 2 (see FIG. 1) is placed near the surface of a rotating element 4 made entirely from an electrically conducting material or at least containing an electrically conductive surface the AC magnetic flux generated by the coil 2 induces eddy currents in the metal. These eddy currents in turn generate a magnetic flux, leading to an altered net flux in the coil 2 and hence an altered inductance of the coil 2. The strength of the eddy currents and hence the inductance of the coil 2 depend on the local electrical conductivity in the surface of the rotating element 4. As the element 4 rotates the local conductivity varies with the period of one revolution and so does the inductance of the sensing coil.

Figure 2:
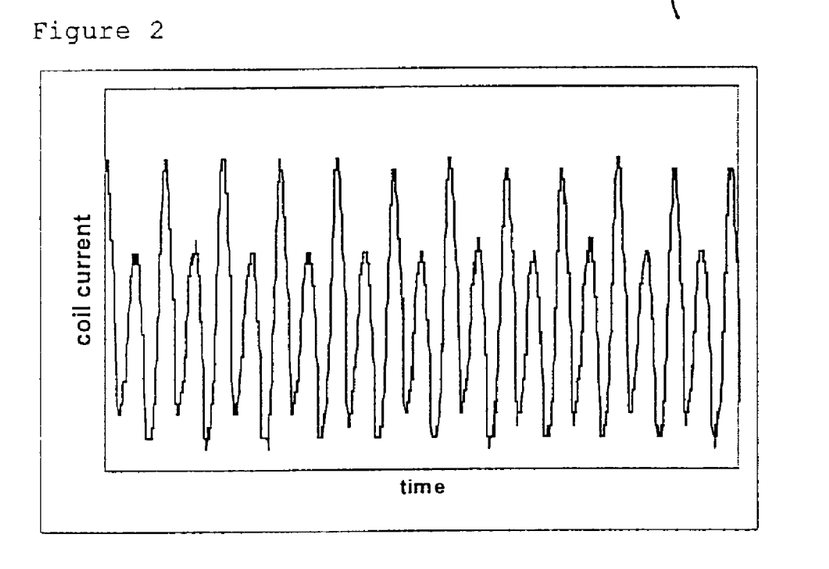
FIG. 2 shows the variation of r.m.s. (root mean square) coil current when a constant r.m.s. AC voltage is applied to a single sensing coil near the surface of a hollow rotating aluminium shaft.

This variation in inductance can be detected from variations in the peak. (or root mean square—rms) coil drive voltage if the coil drive peak (or root mean square—rms) current is kept constant or from variations in the peak (or root mean square) coil drive current if the peak (or root mean square) coil drive voltage is kept constant. FIG. 2 illustrates how the root mean square (r.m.s.) current of the coil 2 varies when a constant rms voltage is applied to a single coil 2 located near the surface of a hollow shaft made from aluminium. A periodic pattern is clearly visible from which the rotation speed can be derived as will be explained below.

Figure 1:
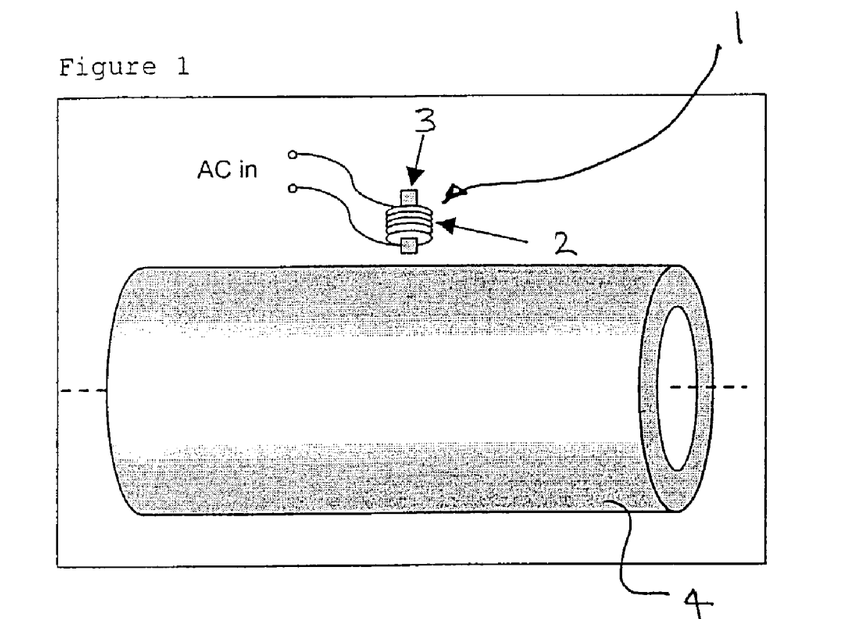
FIG. 1 illustrates an embodiment of the present invention.
Figure 3:
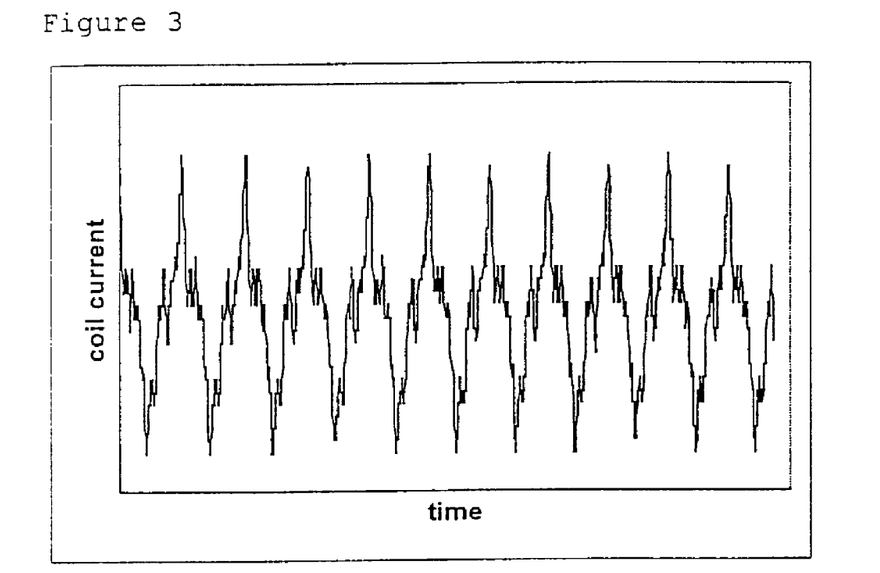
FIG. 3 shows the variation of r.m.s. (root mean square) coil current when a constant r.m.s. AC voltage is applied to a single sensing coil near the surface of a hollow rotating industrial grade ferromagnetic steel shaft.

If the system of FIG. 1 is used in connection with a magnetic rotating element, when the material of the rotating element has a relative magnetic permeability, say, $\mu_{rel} > 1$, (in most cases such materials are metallic and hence also electrically conducting, but this is not a necessary requirement) the rotating element 'guides' the magnetic flux better than the surrounding air. The system works by monitoring changes in the magnetic permeability and therefore works best when used in conjunction with an element having a sufficiently high permeability for any changes due to microstructure variations to be noticeable. Ideally the $\mu_{rel} >> 1$. Hence the AC magnetic flux pattern generated by the coil 2 is modified by the presence of the rotating element 4 and this again affects the net flux in the coil 2 and thereby alters the coil's inductance. As the element 4 rotates the local magnetic permeability varies with the period of one revolution and so does the inductance of the coil 2. This can be detected from variations in the drive voltage if the peak or rms drive current is kept constant or from variations in the drive current if the peak or rms drive voltage is kept constant. The latter is illustrated in FIG. 3 for a hollow shaft made from an industrial grade ferromagnetic steel. A periodic pattern is clearly visible from which the rotation speed can be derived as will be explained below.

In an alternative embodiment of the invention (FIG. 4), two coils 5,6 are placed on a common magnetically soft (i.e. a material which reverts to an almost macroscopic non-magnetic state once the external magnetic field is removed) core 7. The core 7 is preferably in the shape of a U with the open side directed towards the surface of the rotating element 4. The first (drive) coil 5 in this embodiment generates an AC magnetic flux which is guided through the U-shaped core 7 and the rotating element 4 to form a closed magnetic circuit. The proportion of the AC magnetic flux passing through the second (sensing or pick-up) coil 6 induces a voltage in this coil 6 which provides the output signal. The proportion of magnetic flux passing through the sensing or pick-up coil 6 depends on the eddy currents generated in the surface of the rotating element 4 and hence the local electrical conductivity and/or on the amount of magnetic flux guided through the surface of the rotating element 4 and hence the local magnetic permeability. As the element 4 rotates the local material properties fluctuate with the period of one revolution and therefore the voltage induced in the sensing or pick-up coil 6 also fluctuates.

Figure 4:
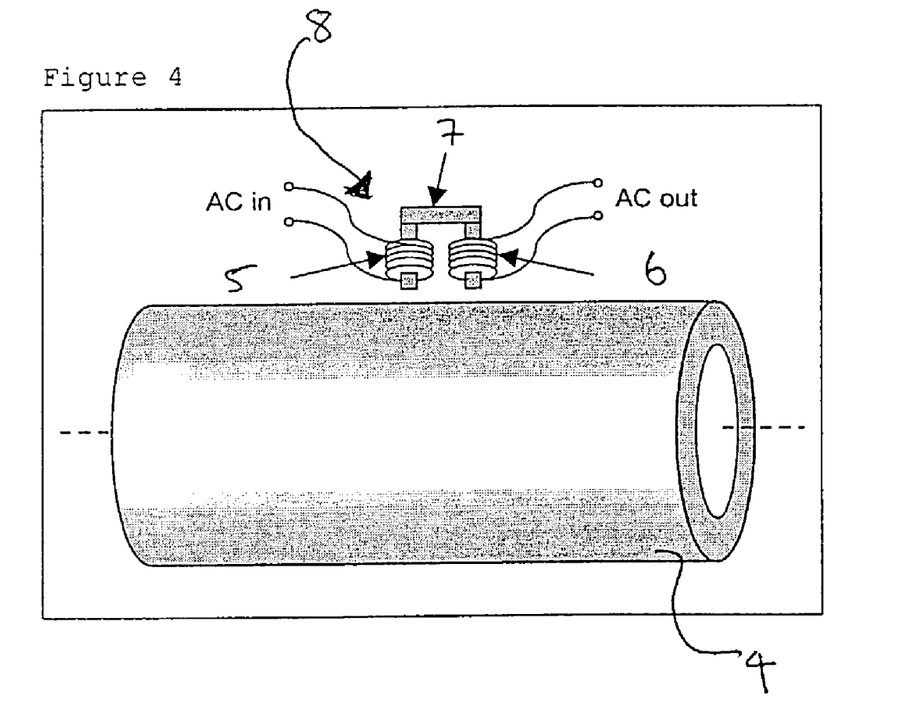
FIG. 4 shows a rotation speed sensor embodying the invention and consisting of two coils on a common U-shaped core.

The signals shown in FIGS. 2 and 3, which have been generated by an AC sensing coil 2 of the type shown in FIG. 4 in tests on real machine drive shafts, exhibit a clear periodic pattern which can be easily evaluated by conventional signal processing means (e.g. a level or slope threshold could be used to start and stop a timer counter), or a Fourier transformation could be computed to directly obtain the frequency of the periodic signal. Usually there are several distinct features in the fluctuations of the materials properties around the circumference of the rotating element which lead to a periodic signal with the periodicity being an integer multiple (higher harmonics) of the rotation speed. This can be clearly seen in FIG. 2. Signal processing means (in particular Fourier transformation) will detect all periodicities in the sensing coil output signal. The rotation speed is the lowest of these frequencies.

Even though the signals shown in FIGS. 2 and 3 exhibit a clear periodic pattern any signal generated by local fluctuations of material properties and containing at least the periodicity of one revolution of the rotating element can be used to determine the rotation speed of the rotating element or portion of a device. This is best done by computing the auto-correlation function A(T) of the time dependent voltage or current signal S(t) as follows:

$$A(\tau) = \int S(t)S(t+\tau)dt$$

Figure 5A:
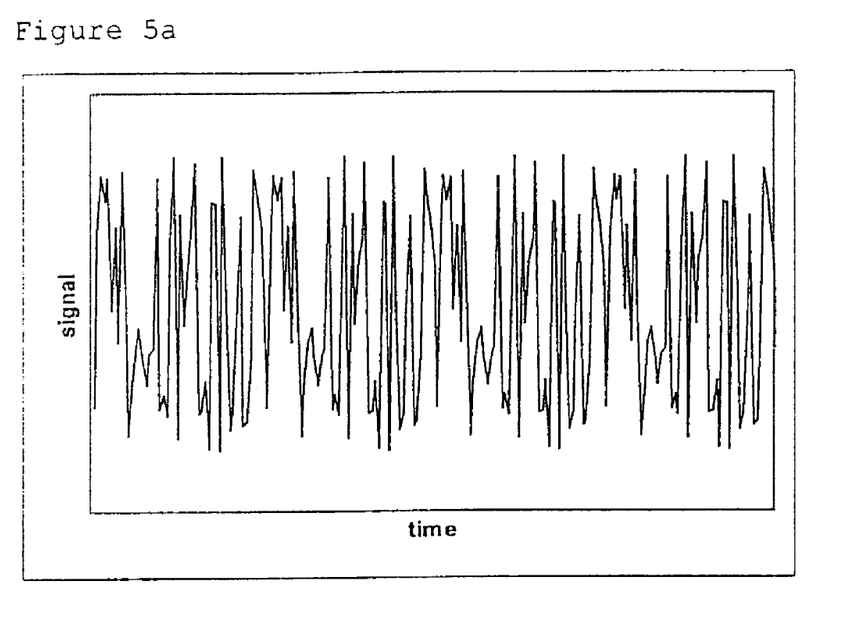
Figure 5B:
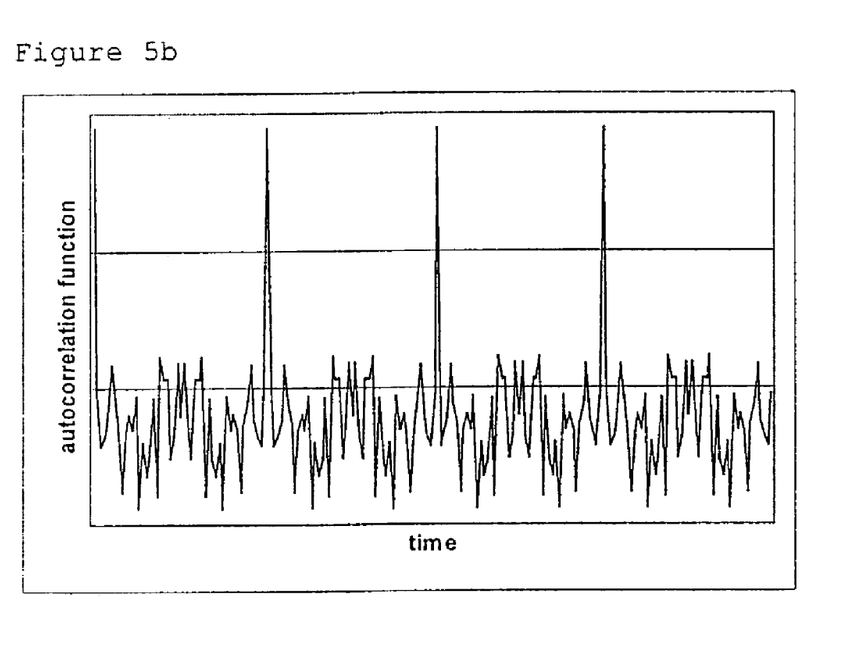

The auto-correlation function acts as a filter to retrieve "hidden" periodicities from noisy signals. This effect is illustrated in FIG. 5 for the extreme case of a signal consisting of random noise which repeats itself after one complete revolution. The periodic noise signal is shown in FIG. 5a while the auto-correlation function $A(\tau)$ is shown in FIG. 5b. The auto-correlation function contains a clear signature of the periodicity which may otherwise not be obvious from the measured signal S(t). The time (t) between the adjacent peaks in FIG. 5b corresponds to the time for one revolution of the rotating element from which the rotation speed (w) can be computed. Rotation speed is typically given as a frequency measurement of rotations per minute (rpm) or Hz and is therefore simply the appropriate multiples of the inverse of the time per revolution.

The net flux in the single driving and sensing coil 2 of the first embodiment or the magnetic flux guided through the pick-up or sensing coil 6 of the second embodiment (FIG. 4) also depends on the distance ('air gap') between the sensor 1,8 and the surface of the rotating element 4. In most devices with rotating elements the air gap varies with time due to, e.g. vibrations of the device and/or element. A variation of the air gap leads to an unwanted variation of the sensing coil output signal in addition to the wanted signal arising from local fluctuations of material properties. There are two types of vibrations i) synchronous vibrations and ii) random or non-periodic vibrations. In the case of i) the frequency of the vibrations is the same as the rotation frequency or higher harmonic of the latter and therefore will not effect the measurement of the rotation speed. In the case of ii) the advantage of deducing the rotation speed from the auto-correlation function lies in the rejection of any non-periodic signals. Using the auto-correlation function will therefore help eliminate errors caused by non-periodic variations such as non-periodic variations of the air gap.

The method and apparatus for rotation speed measurement described above can also be utilised to measure torque transmitted by a rotating element. The proposed method is based on determining the angular deflection or twist of a dedicated section of the torque transmitting element by placing two speed sensors of the type discussed above and shown in either FIG. 1 or 4.

Figures 6, 7:
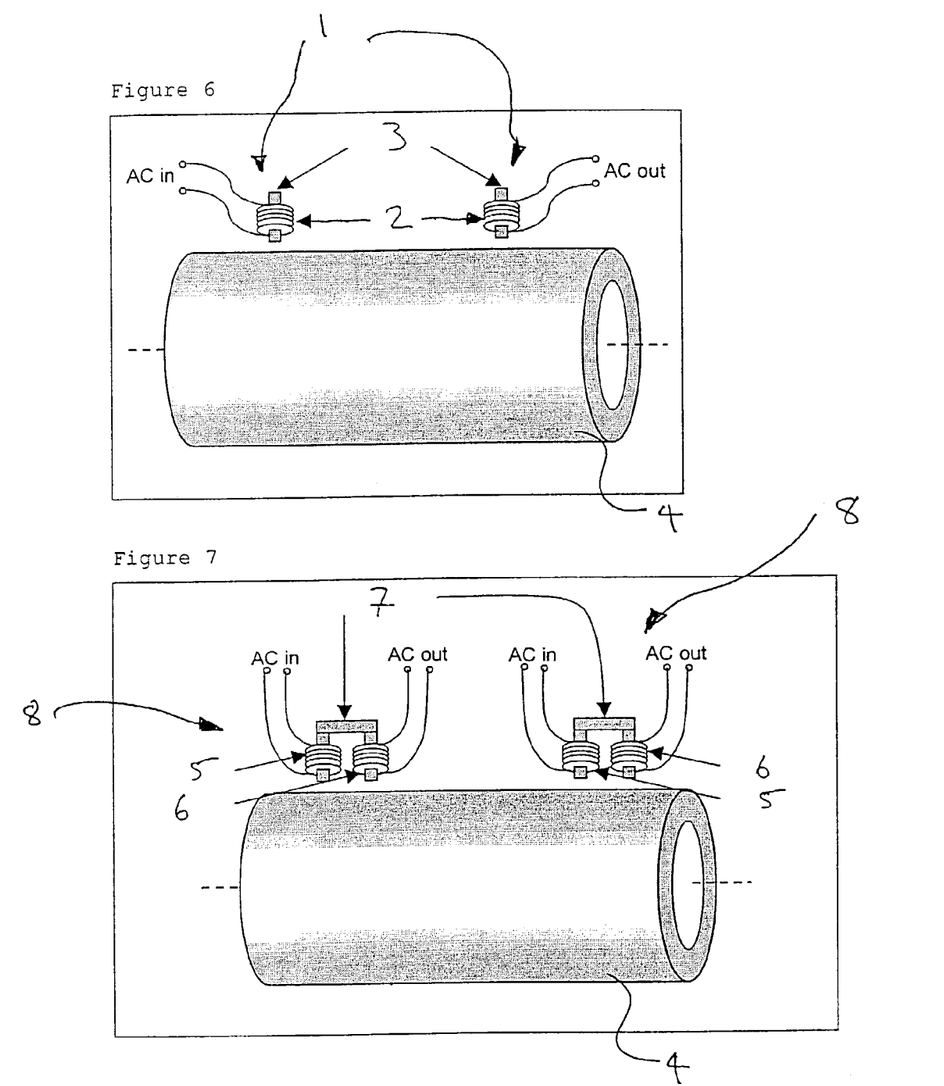
FIG. 6 illustrates a torque sensing apparatus embodying the present invention.
FIG. 7 illustrates a second torque sensing apparatus embodying the present invention.

For measuring the torque of a longitudinal element such as a shaft or drum, the two sensors 1,8 are located a pre-determined distance apart along the surface of the shaft or drum 4 parallel to the shaft or driving axis of rotation (see FIGS. 6 and 7).

When measuring the torque applied to a disc, the two sensors 1,8 may be placed a pre-determined distance apart along a radius of the surface of the disc near the surface of the torque transmitting element at either end of the dedicated radial section (not shown).

Each sensing device 1,8 will measure a signal of the kind shown in FIG. 2 or 3. Both signals have the same periodicity as defined by one rotation of the rotating and torque transmitting element. However, as the signals depend on local variations of the material properties in the rotating element, and the sensing devices are placed at different locations near the rotating element 4, the details within both signals may be substantially different. In order to obtain the angular deflection of the torque transmitting element the phase shift between the two periodic signals $S_1(t)$ and $S_2(t)$ is derived from the cross-correlation function $C(\tau)$ which is defined as:

$$C(\tau) = \int S_1(t) S_2(t+\tau) dt$$

Figure 8A:
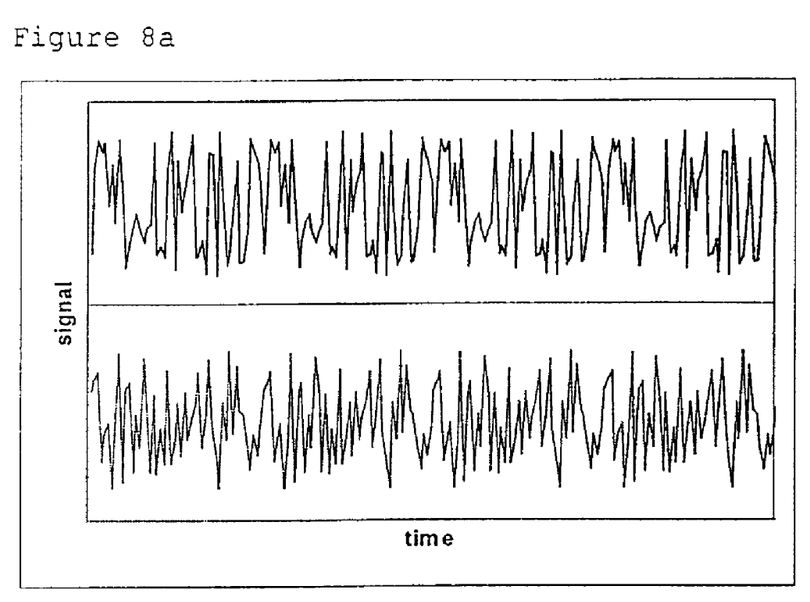
Figure 8B:
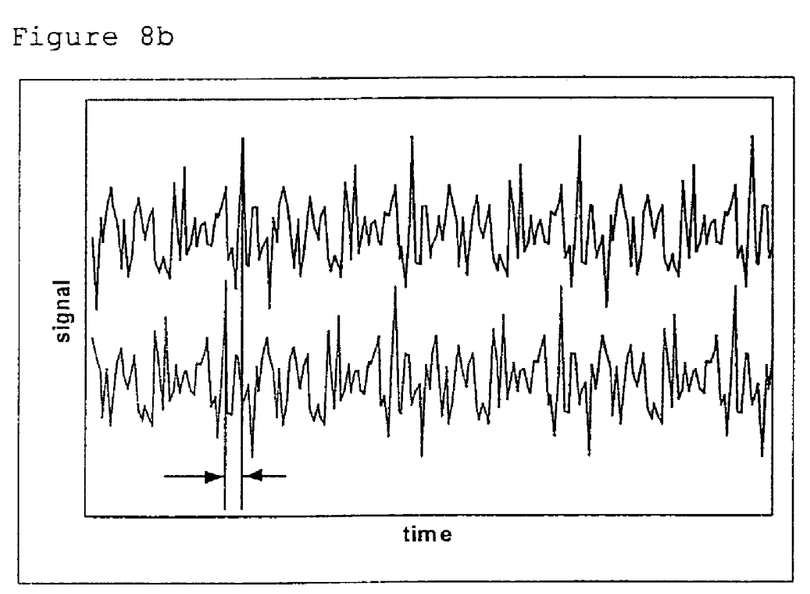

The use of the cross-correlation function is known in radar applications for delay measurement. This effect is illustrated in FIG. 8 for the case of two signals recorded by each of the two sensing devices. Each individual signal consists of random noise repeating itself after one complete revolution, i.e. both signals have the same periodicity but contain a different noise pattern. These periodic noise signals are shown in FIG. 8a for the case of zero torque (no phase shift). The resulting cross-correlation function is represented by the top curve in FIG. 8b. If one of the periodic signals from FIG. 8a is phase shifted with respect to the other, the resulting cross-correlation function is represented by the bottom curve in FIG. 8b. The phase shift and hence the twist of the rotating element can be determined from the time difference between the periodic feature in the two cross-correlation functions if the cross-correlation function for the case of zero torque is kept in the memory of the computing electronics. The torque can then be determined from the twist. For the example of torque measurement for a circular shaft, torque T is given as $$T = \frac{GJ\theta}{L}$$

where G is shear modulus, J is the moment of inertia, θ is the twist of the dedicated measuring section and L is the length of the dedicated measuring section.

What is claimed is:

1. A method of measuring at least one of movement, displacement and deformation of at least part of a rotating element, said method including the steps of:
   providing a rotating element with at least one of an electrically conductive and magnetic surface;
   generating a magnetic field within which the element rotates;
   monitoring changes in the magnetic field caused by movement of naturally occurring variations in at least one of the electrical conductivity and magnetic permeability of the at least one of electrically conductive and magnetic surface as the element rotates;
   noting the periodicity of the changes in the magnetic field; and
   using the periodicity to calculate the amount of at least one of movement, displacement and deformation of the at least a portion of the surface of the rotating element.

2. A method according to claim 1 wherein the naturally occurring variations arise from naturally occurring variations in at least one feature of the rotating element such as the microstructure of said rotating element, wherein said feature is at least one of grain size, grain shape, grain orientation, grain boundaries, crystal structure and surface roughness.

3. A method according to claim 1 in which the magnetic field is generated by passing an AC current through a coil of electrically conductive material placed near the surface of the rotating element, and the changes in the magnetic field are monitored by monitoring changes in the coil's inductance as the element rotates.

4. A method according to claim 3 in which at least one of a constant peak amplitude and root mean square voltage AC current is supplied to the coil and changes in the coil's inductance are monitored by sensing the current passing through the coil.

5. A method according to claim 4 in which the periodicity of the changes in inductance of the coil is determined using the auto-correlation function $$A(\tau) = \int S(t) S(t+\tau) dt$$

where t is time and τ is an interval time shift from t, −A(τ) is the auto-correlation function and the sensed time-dependent current signal is S(t).

6. A method according to claim 3 in which one of a constant peak amplitude and root mean square voltage AC current is supplied to the coil and changes in the inductance of the coil are monitored by sensing the voltage across the coil.

7. A method according to claim 6, wherein the periodicity of the changes in inductance in the coil is determined using the auto-correlation function $$A(\tau) = \int S(t) S(t+\tau) dt$$

where t is time and τ is an interval time shift from t, A(τ) is the auto-correlation function and the sensed time-dependent voltage signal is S(t).

8. A method of measuring the twist of a rotating element according to claim 3 including the steps of
providing two separate coils a pre-determined distance apart,
generating two periodic output signals $S_1(t)$ and $S_2(t)$, each representative of the changes to one of the coils's inductance as the rotating element rotates,
determining the measured cross-correlation function $C_m(\tau)$ of the two periodic signals $S_1(t)$ and $S_2(t)$ using the cross-correlation function $$C(\tau) = \int S_2(t) S_2(t+\tau) dt$$

where t is time and τ is an interval time shift from t, and
comparing the measured cross-correlation function $C_m(\tau)$ with a stored cross-correlation function $C_s(\tau)$ which corresponds to the measured periodic output signals when the rotating element has zero applied torque to determine the phase shift between the measured and stored cross-correlation functions $C_m(\tau)$ and $C_s(\tau)$, using the phase shift determination as a measurement of twist.

9. A method of measuring torque according to claim 8.

10. A method according to claim 1 in which the magnetic field is generated by passing an AC current through a drive coil of electrically conductive material placed around a magnetic core placed near the surface of the rotating element and the changes in the magnetic field are monitored by monitoring at least one of the voltage and current induced in one of a second sensing coil and pick-up coil of electrically conductive material placed around said magnetic core.

11. A method according to claim 10 in which one of a constant peak amplitude and root mean square voltage AC current is supplied to the drive coil and changes in the inductance of one of the sensing coil and pick-up coil is monitored by sensing the current passing through said one of the sensing coil and pick-up coil.

12. A method according to claim 11, wherein the periodicity of the changes in the sensing or pick-up coil's inductance are determined using the auto-correlation function $$A(\tau) = \int S(t) S(t+\tau) dt$$

where t is time and τ is an interval time shift from t, A(τ) is the auto-correlation function and the sensed time-dependent current signal is S(t).

13. A method according to claim 10 in which at least one of a constant peak amplitude and root mean square voltage AC current is supplied to the drive coil and changes in inductance in one of the sensing coil and pick-up coil is monitored by sensing the voltage across one of the sensing coil and pick-up coil.

14. A method according to claim 13, wherein the periodicity of the changes in the inductance of said one of the sensing coil and pick-up coil is determined using the auto-correlation function where is time and τ is an interval time shift from t, A(τ) is the auto-correlation function and the sensed time-dependent voltage signal is S(t)

$$A(\tau) = \int S(t) S(t+\tau) dt.$$

15. A method of measuring the twist of a rotating element according to claim 10 including the steps of providing
two separate magnetic cores, each having a drive coil and a sensing coil, the cores being placed a pre-determined distance apart along the rotating element's axis of rotation,
generating two periodic output signals $S_1(t)$ and $S_2(t)$, each representative of the changes to one of the sensing coils' inductance changes as the rotating element rotates,
determining the measured cross-correlation function $C_m(\tau)$ of the two periodic signals $S_1(t)$ and $S_2(t)$ using the cross-correlation function $$C(\tau) = \int S_1(t) S_2(t+\tau) dt$$

where t is time and τ is an interval time shift from t,
comparing the measured cross-correlation function $C_m(\tau)$ with a stored cross-correlation function $C_s(\tau)$ which corresponds to the sensed periodic output signals when the rotating element has zero applied torque to determine the phase shift between the measured and stored cross-correlation functions $C_m(\tau)$ and $C_s(\tau)$, using the phase shift determination as a measurement of twist.

16. A method of measuring torque according to claim 15.

17. A method according to claim 1 in which a time-dependent output signal S(t) representative of the changes in the magnetic field is produced and the periodicity of the changes in the magnetic field are determined using an auto-correlation function $$A(\tau) = \int S(t) S(t+\tau) dt$$

where t is time and τ is an interval time shift from t, A(τ) is the auto-correlation function and the time-dependent output signal is S(t).

18. A method for sensing the rotation speed of a rotating element according to claim 1.

19. Apparatus for measuring at least one of movement, displacement and deformation of at least part of a rotating element including at least one of an electrically conductive and magnetic surface, said apparatus comprising;
field generating means for generating a magnetic field in which the element rotates,
sensing means for monitoring changes in the magnetic field caused by the movement of naturally occurring variations in at least one of the electrical conductivity and magnetic permeability of the at least one electrically conductive and magnetic surface as the element rotates,
first data processing means for noting the periodicity of the changes in the magnetic field, and
second data processing means for using the periodicity to calculate the amount of said at least one of movement, displacement and deformation of the surface of the at least part of a rotating element.

20. Apparatus according to claim 19 including a coil of electrically conductive material placed near the surface of the rotating element, and connected to a supply of an AC current wherein the sensing means monitors changes in the magnetic field by monitoring changes in the inductance of the coil as the element rotates.

21. Apparatus according to claim 20 including means for sensing one of current passing through and voltage across the coil.

22. Apparatus for measuring the twist of a rotating element according to claim 20 including two separate coils a pre-determined distance apart for generating two periodic output signals $S_1(t)$ and $S_2(t)$, each representative of the changes to one of the coil's inductance as the rotating element, the data processing means determine the measured cross-correlation function $C_m(\tau)$ of the two periodic signals $S_1(t)$ and $S_2(t)$ $$C(\tau) = \int S_1(t) S_2(t+\tau) dt$$

where t is time and τ is an interval time shift from t, and compare the measured cross-correlation function $C_m(\tau)$ with a stored cross-correlation function $C_s(\tau)$ which corresponds to the sensed periodic output signals when the rotating element has zero applied torque to determine the phase shift between the measured and stored cross-correlation functions $C_m(\tau)$ and $C_s(\tau)$, and use the phase shift determination as a measurement of twist.

23. Torque measuring apparatus according to claim 22.

24. Apparatus according to claim 19 including a drive coil of electrically conductive material connected to a supply of an AC current and placed around a magnetic core placed near the surface of the rotating member, and one of a second sensing coil and pick-up coil of electrically conductive material placed around said magnetic core.

25. Apparatus according to claim 24 including means for sensing one of current passing through and voltage across the coil.

26. An apparatus for measuring the twist of a rotating element according to claim 24 including two separate magnetic cores, each having a sensing coil and a drive coil, the cores being placed a pre-determined distance apart along the rotating element's axis of rotation, for generating two periodic output signals $S_1(t)$ and $S_2(t)$, each representative of the changes to one of the sensing coils' inductance changes as the rotating element rotates, and the data processing means determine the measured cross-correlation function $C_m(\tau)$ of the two periodic signals $S_1(t)$ and $S_2(t)$ $$C(\tau)=\int S_1(t)S_2(t+\tau)dt$$

where t is time and τ is an interval time shift from t, and compare the measured cross-correlation function $C_m(\tau)$ with a stored cross-correlation function $C_s(\tau)$ which corresponds to the sensed periodic output signals when the rotating element has zero applied torque to determine the phase shift between the measured and stored cross-correlation functions $C_m(\tau)$ and $C_s(\tau)$, and use the phase shift determination as a measurement of twist.

27. Torque measuring apparatus according to claim 26.

28. Apparatus according to claim 19 in which the sensing means produces a time-dependent output signal S(t) representative of the changes in the magnetic field and the data processing means determine the periodicity of the changes in the magnetic field using an auto-correlation function $$A(\tau)=\int S(t)S(t+\tau)dt$$

where t is time and τ is an interval time shift from t, $A(\tau)$ is the auto-correlation function and the time-dependent output signal is S(t).

29. Apparatus for sensing the rotation speed of a rotating element according to claim 19.

30. A method of measuring the rotation speed of a rotating element including the steps of:
providing a rotating element with at least one of an electrically conductive and magnetic surface;
generating a magnetic field in which the element rotates by passing an AC current through a coil of electrically conductive material placed near the surface of the rotating element;
monitoring changes in the magnetic field caused by the movement of naturally occurring variations in at least one of the electrical conductivity and magnetic permeability of the at least one of the electrically conductive and magnetic surface as the element rotates by monitoring changes in the inductance of the coil as the element rotates;

generating a coil time-dependent output signal S(t) representative of the changes in the inductance of the coil; and
calculating the auto-correlation function $$A(\tau)=\int S(t)S(t+\tau)dt$$

where t is time and τ is an interval time shift from t, $A(\tau)$ is the auto-correlation function and the time-dependent output signal is S(t) and element.

31. A method of measuring the twist of a rotating element including the steps of:
providing a rotating element with at least one of an electrically conductive and magnetic surface;
providing two separate coils of electrically conductive material a pre-determined distance apart;
generating two magnetic fields through which the element rotates at separate locations near the surface of the rotating element and a pre-determined distance apart by passing alternating current through the two said coils;
monitoring changes in the magnetic fields caused by movement of the naturally occurring variations in at least one of the electrical conductivity and magnetic permeability of the at least one of the electrically conductive and magnetic surface by monitoring changes in inductance of the coil as the elements rotate;
generating two coil output time-dependent signals $S_1(t)$ and $S_2(t)$, each signal representative of the changes in inductance of one of the coils as the rotating element rotates;
determining the measured cross-correlation function $C_m(\tau)$ of the two periodic signals $S_1(t)$ and $S_2(t)$ $$C(\tau)=\int S_1(t)S_2(t+\tau)dt$$

where t is time and τ is an interval time shift from t,
comparing the measured cross-correlation function $C_m(\tau)$ with a stored cross-correlation function $C_s(\tau)$ which corresponds to the sensed periodic output signals when the rotating element has zero applied torque to determine the phase shift between the measured and stored cross-correlation functions $C_m(\tau)$ and $C_s(\tau)$, using the phase shift determination as a measurement of twist.

32. A method of measuring torque according to claim 31.

33. A method of measuring the twist of a rotating element including the steps of:
providing a rotating element with at least one of an electrically conductive and magnetic surface;
providing two separate magnetic cores, each having a sensing coil and a drive coil, the cores being placed a pre-determined distance apart along the rotating element's axis of rotation,
generating two magnetic fields through which the element rotates at separate locations near the surface of the rotating element and a pre-determined distance apart by passing alternating current (AC current) through the two said sensing coils;
monitoring changes in the magnetic fields caused by movement of the naturally occurring variations in at least one of the conductivity and magnetic permeability of the at least one of conductive and magnetic surface by monitoring changes in the inductance of the drive coil as the element rotates generating two coil output time-dependent signals $S_1(t)$ and $S_2(t)$, each representative of the changes in inductance of one of the sensing coils as the rotating element rotates;

determining the measured cross-correlation function $C_m(\tau)$ of the two periodic signals $S_1(t)$ and $S_2(t)$ $$C(\tau)=\int S_1(t)S_2(t+\tau)dt$$

where t is time and $\tau$ is an interval time shift from t, comparing the measured cross-correlation function $C_m(\tau)$ with a stored cross-correlation function $C_s(\tau)$ which corresponds to the sensed periodic output signals when the rotating element has zero applied torque to determine the phase shift between the measured and stored cross-correlation functions $C_m(\tau)$ and $C_s(\tau)$, using the phase shift determination as a measurement of twist.

34. A method of measuring torque according to claim 33.

* * * * *